May 13, 1952   F. P. BOUCHARD   2,596,809
DRILL REMOVER
Filed June 7, 1951
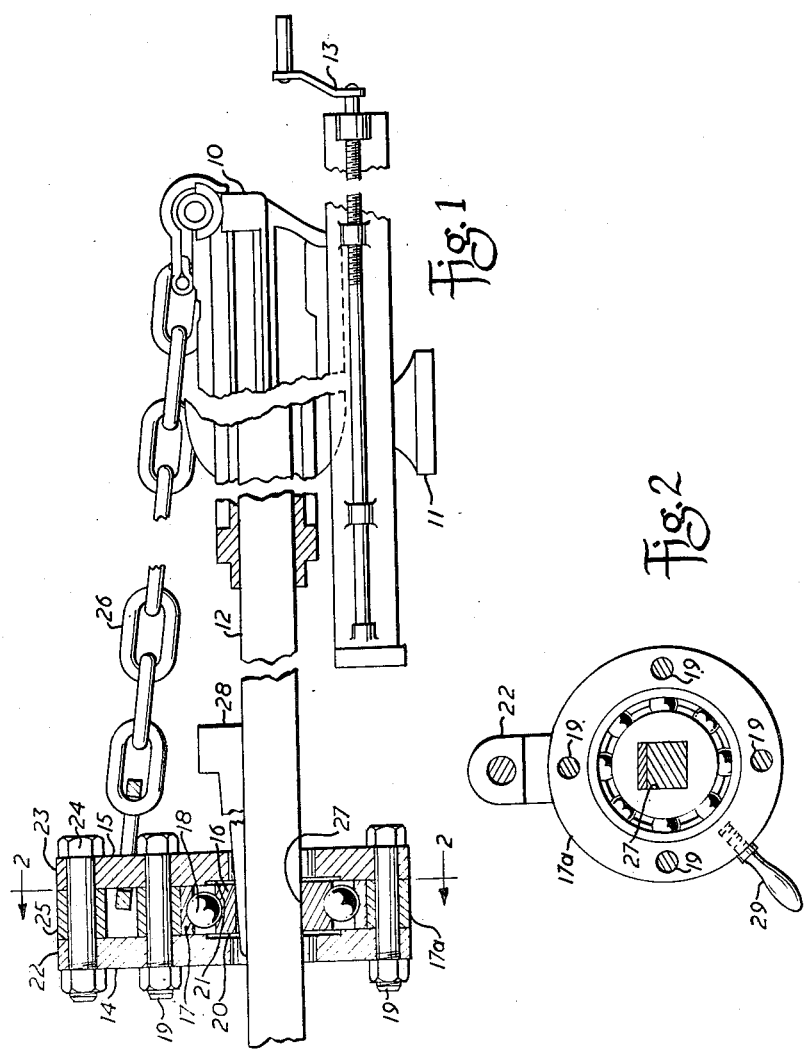
Inventor
FRANCOIS P. BOUCHARD
by: Fetherstonhaugh & Co.
Attys.

Patented May 13, 1952

2,596,809

UNITED STATES PATENT OFFICE 2,596,809

DRILL REMOVER

François P. Bouchard, Timmins, Ontario, Canada

Application June 7, 1951, Serial No. 230,289

3 Claims. (Cl. 255—36)

This invention relates to a device for pulling drill steel from a hole in rock or the like into which it has been driven by the head of a hammer action drill.

In the mining and the related arts, it is the practice to drill holes with drills which comprise a drill head that exerts a hammer-like force on a length of drill steel to make a hole. The drill steel has an enlarged head portion, and in use, broken rock becomes lodged behind the enlarged head portion, thus making it difficult to remove the drill steel from the hole.

I have invented a simple device for removing the drill steel when it becomes stuck in a hole.

It has been an object of my invention to provide a simple and rugged device for removing drill steel from a hole into which it has been hammered.

It is a further object of my invention to make a drill steel puller that is cheap to manufacture.

With these and other objects in view, my drill steel puller comprises a casing which houses a bearing assembly having an inner race, an outer race, and roller bearings between the two races to permit relative rotation therebetween. The outer race is rigidly retained within the casing while the inner race is free to rotate with respect to the casing. A through opening is formed in the inner race for sliding engagement with a cross section of a piece of drill steel. A wedge is provided that co-operates with the latter mentioned opening in the inner race of the bearing assembly to bind the inner race with respect to the drill steel, and a chain is provided for rigid connection to the casing.

In use, the inner race is bound to the drill steel by means of the wedge, and the chain is connected to the casing and to the head of the drill. The drill head is then caused to operate and cranked to cause it to retract from the hole thereby dragging the drill steel with it from the hole. The invention will be clearly understood after reference to the following detailed specification read in conjunction with the drawings.

In the drawings:

Figure 1 is a view showing a puller according to the invention in section mounted in position with respect to a piece of drill steel and a drill.

Figure 2 is a view along the plane 2—2 of Figure 1.

In the drawings I have shown a drill and a piece of drill steel of the general type that I contemplate my invention will be used with. The drill comprises a drill head 10 mounted on a stand 11. The drill steel 12, which in the present case is square in the cross-section, is driven forward into the rock or the like by means of a hammering effect produced within the head 10. The power is usually pneumatic. The steel is fed forward by means of the crank 13 for the head 10 as the hole is drilled. The type of drill concerned is well-known and need not be explained in any further detail in this specification because the specification is not concerned with the drill but only with a device for use with the drill of this general type for removing drill steel such as the drill steel 12 from a hole when it becomes stuck.

The principle upon which my drill steel remover works is to lock the drill steel 12 with respect to the head 10 so that as the crank 13 is turned to move the head 10 away from the hole, the drill steel 12 will be drawn with it. (The end of the drill steel that enters the drill head is not normally rigidly held therein.)

The embodiment of my invention shown in the drawings comprises a casing formed from plates 14 and 15 which house a bearing assembly having an inner race 16 and an outer race 17 and a bearing 18 between the two races to permit relative rotation therebetween. The outer race 17 of the bearing assembly is rigidly mounted within the casing comprised of the plates 14 and 15 by means of a series through nuts and bolts 19 which retain the plates in rigid abutting relation with the sides of the outer bearing race. The marginal areas of the inner sides of plates 14 and 15 are cut away as at 20 and 21 to prevent the plates from fouling with the inner bearing race 16 and to permit the inner race to rotate freely with respect to the casing.

Numeral 17a indicates an annular spacer having the same width as the outer bearing race 17. It will be apparent that this spacer member could be formed integral with the outer bearing race 17 instead of as shown. In my claims to invention, I intend that the term outer bearing race should include the spacer 17a in the embodiment shown since it does form a part of the outer race assembly and is held rigid with respect to the casing plates 14 and 15 in the same way as the race 17.

The sides 14 and 15 of the casing are each formed with a projecting finger 22 and 23 respectively, that is, are bored to receive a nut and bolt assembly 24 which is tightened against a spacer 25. In use, the loop so formed is for connection to the free end of the chain 26.

The through opening 27 in the inner bearing race 16 is rectangular in cross-section for sliding engagement over the cross-section of a drill rod 12. A wedge 28 co-operates with the hole to cause it to bind against the drill steel.

Handle 29 on the casing can also be provided. It threads into plate 17a.

In use, when the drill steel becomes stuck, the head of the drill is moved rearwardly free of the steel and the pulling device casing complete with its bearing assembly is slid over the drill steel as indicated in Figure 1. The drill head is then again caused to engage with the drill steel and is connected to the loop formed by fingers 22 and 23 at one free end and to the head of the drill 10 at the other free end as indicated in Figure 1. The wedge 28 is then forced between the opening 27 in the inner bearing race and the drill steel with the chain 26 full taut and the drill is caused to hammer the drill steel as the crank 13 is turned to cause the head 10 to draw away from the hole. As the head 10 is withdrawn, of course, it will pull with it the drill steel.

It will be apparent that the inner bearing race is rigidly secured to the drill steel and that the inner bearing race rotates with respect to the casing. This permits the drill steel to turn as it is withdrawn without twisting the chain 26. The handle 29 can be used for holding the casing from rotation due to action of the drill head during use.

The embodiments of my invention shown in the drawings will be apparent to those skilled in the art and I do not intend that my invention shall be limited to the foregoing specific embodiment.

What I claim as my invention is:

1. A drill steel pulling device comprising a casing, a bearing assembly mounted within said casing having an inner race, an outer race, and roller bearings between said two races to permit relative rotation therebetween, said outer race being rigidly mounted within said casing, said inner race being formed with a through opening for sliding engagement over a drill steel and mounted for rotation with respect to said casing, a wedge for co-operation with said opening of said inner race formed to bind said inner race to a drill steel, a puller chain, said casing being formed for connection to said puller chain.

2. A device for pulling ground steel as claimed in claim one in which said casing has a handle rigidly mounted thereon.

3. A device for pulling ground steel as claimed in claim one in which said casing comprises two annular plates and securing means for retaining said plates in parallel relation to each other in abutting relation with the opposed sides of said outer bearing race, the marginal areas of the inner sides of said plates being formed to avoid frictional contact with said inner race.

FRANÇOIS P. BOUCHARD.

REFERENCES CITED

The following references are of record in the file of this patent:

UNITED STATES PATENTS

| Number | Name | Date |
|---|---|---|
| 656,464 | Long et al. | Aug. 21, 1900 |
| 1,305,353 | Gipson | June 3, 1919 |
| 1,851,599 | Smith | Mar. 29, 1932 |